United States Patent [19]

Heneker et al.

[11] Patent Number: 4,725,038

[45] Date of Patent: Feb. 16, 1988

[54] VALVE ASSEMBLIES

[76] Inventors: Stephen R. Heneker, 60 Broadwood Avenue, Ruislip, Middlesex; Leslie T. Reeve, deceased, late of Aylesbury, Buckinghamshire; Jean M. Reeve, executrix, 53 Chaucer Drive, Aylesbury, Buckinghamshire, all of England

[21] Appl. No.: 857,934

[22] Filed: Apr. 30, 1986

Related U.S. Application Data

[63] Continuation-in-part of Ser. No. 516,142, Jul. 21, 1983, abandoned.

[30] Foreign Application Priority Data

Jul. 23, 1982 [GB] United Kingdom ............... 8221306
Oct. 21, 1982 [GB] United Kingdom ............... 8230022

[51] Int. Cl.⁴ .......................................... F16K 31/126
[52] U.S. Cl. ....................................... 251/25; 137/801
[58] Field of Search ............... 251/25, 43, 45, 77, 251/78; 137/614.13, 614.15, 636, 637, 637.1, 801

[56] References Cited

U.S. PATENT DOCUMENTS

| | | | |
|---|---|---|---|
| 595,061 | 12/1897 | Gulland | 251/25 |
| 954,898 | 4/1910 | Stenberg | 137/636 |
| 2,180,320 | 11/1939 | Hansen | 251/25 |
| 2,222,141 | 11/1940 | Denison | 251/78 |
| 2,337,659 | 12/1943 | Hughey et al. | 137/637.1 |
| 2,627,873 | 2/1953 | Bothe | 251/25 |
| 2,698,729 | 1/1955 | Cox et al. | 251/25 |
| 2,757,688 | 8/1956 | Klinger | 137/625.44 |
| 3,055,630 | 9/1962 | Becker | 251/45 |
| 3,805,837 | 4/1974 | Stampfli | 137/625.6 |
| 3,904,167 | 9/1975 | Touch et al. | 251/30.05 X |
| 3,955,791 | 5/1976 | Meckstroth | 251/11 |
| 4,074,699 | 2/1978 | Stampfli | 137/625.64 |

FOREIGN PATENT DOCUMENTS

| | | | |
|---|---|---|---|
| 622430 | 11/1935 | Fed. Rep. of Germany | 251/25 |
| 2223605 | 10/1974 | France | 251/25 |
| 496602 | 6/1954 | Italy . | |
| 1007540 | 10/1965 | United Kingdom . | |

Primary Examiner—Gerald A. Michalsky
Attorney, Agent, or Firm—Jack M. Wiseman

[57] ABSTRACT

A domestic pillar faucet has a main flow path and a control flow path, both connected to the same inlet. A diaphragm supports a valve member for displacement between a position in which the valve member is held open and a position in which the valve member closes the main flow path. Displacement of the diaphragm is controlled by fluid from the control flow path. The control flow path includes an inlet valve and an outlet valve and the section of the control flow path between the valves communicates with the diaphragm. By opening the outlet valve, the force on the diaphragm is reduced and the valve member will open. By closing the outlet valve and opening the inlet valve, the force on the diaphragm is increased and the valve member will close. The valves are operated by a lever through push buttons. The faucet is thus operated in a power assisted manner, not needing the dexterity required when opening or closing conventional faucets.

12 Claims, 3 Drawing Figures

VALVE ASSEMBLIES

The present application constitutes a continuation-in-part of the pending application Ser. No. 06/516,142 filed July 21, 1983 by Stephen R. Heneker and Leslie Todd Reeve, Deceased: by Jean M. Reeve, Executrix, now abandoned.

BACKGROUND OF THE INVENTION

1. Field of the Invention

The present invention relates to valve assemblies and to domestic faucets for example.

2. Description of the Prior Art

U.S. Pat. No. 595,061 to Gulland relates to water valves.

Gulland discloses a faucet in which a ball resting on a valve seat is controlled by a flexible diaphragm. The diaphragm in turn is controlled by the pressure in a chamber. The chamber has upstream and downstream control valves which are rigidly coupled together for simultaneous operation.

When the faucet is shut off the upstream control valve is open and the downstream control valve is closed. When the faucet is fully open the upstream control valve is closed and the downstream control valve is open.

When the faucet is partially open *both* upstream and downstream valves are partially open allowing a continuous through flow of water, even under steady state flow conditions from the faucet.

The present invention is distinguished over the cited art in that both control valves are independently operable so that under steady state conditions for any degree of flow from the faucet both control valves are always closed.

With this arrangement for any flow rate setting of the faucet the control chamber is sealed and so has a fixed invariable volume. In this way the position of the diaphragm remains the same, irrespective of any fluctuation in the pressure of the water mains.

U.S. Pat. No. 2,222,141 to Denison discloses a gas valve.

Denison relates to a three-way pilot gas valve in which two control valves are coupled together for simultaneous operation. Neither control valve can move independently of the other.

It is an object of the invention to provide an improved valve assembly. In particular it is an object of the invention to provide a faucet in which the inlet and outlet control valves are independently operable so that the setting of the faucet can be adjusted to achieve any selected constant flow rate from the faucet.

SUMMARY OF THE INVENTION

According to the invention, there is provided a valve assembly comprising a chamber, a diaphragm dividing the chamber into first and second, separate sections, a main inlet and a main outlet, both communicating with the first section, a valve member carried by the diaphragm, movable by the diaphragm, to open and close communication between the main inlet and outlet, the arrangement being such that when fluid pressure in both sections is the same and the valve member is in a closed state, there will be a net force on the diaphragm holding the valve member in its closed state, a control passage communicating with the main inlet and extending to a discharge port, inlet and outlet valves located in the control passage, means providing communication between the second section of the chamber and the section of the control passage located between the two valves, and control means for controlling the two valves in such a manner that to open the flow path between the main inlet and main outlet, the inlet valve is closed and the outlet valve is opened, thereby to reduce pressure in the second section and so allow the diaphragm to move the valve member into an open state, and to close the flow path between the main inlet and main outlet, the inlet valve is opened and the outlet valve is closed.

According to the invention, there is also provided a valve assembly comprising a housing defining a chamber, a diaphragm located in the chamber to divide the chamber into two separate sections, a main flow path connected to one section and a control flow path connected to the other section, both the main and control flow paths being arranged to be connected to a common source of fluid, a valve member supported by the diaphragm and movable in response to relative changes in pressure between the two sections to open and close the main flow path, an inlet and an outlet control valve located in the control flow path respectively upstream and downstream of the connection of the flow control path to the said other section, the two control valves enabling the pressure in said other section to be changed and thereby controlling the opening and closing of the main flow path by said valve member.

BRIEF DESCRIPTION OF THE DRAWING

A domestic water pillar faucet or tap embodying the invention will now be described by way of example, with reference to the accompanying diagrammatic drawings, in which.

DESCRIPTION OF THE PREFERRED EMBODIMENTS

Figure 1:
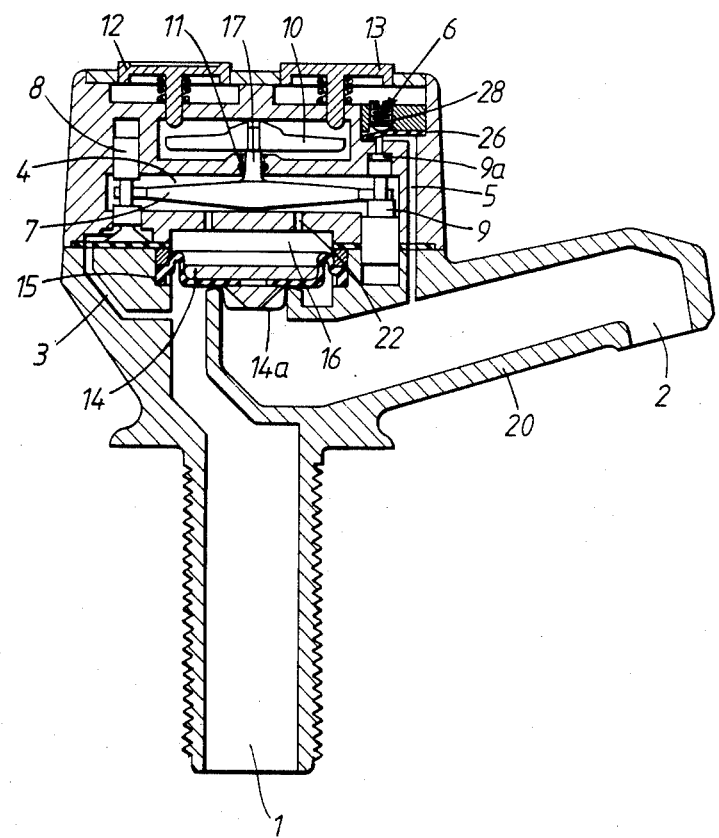
FIG. 1 is a section through the faucet.

The faucet shown in FIG. 1 includes an inlet 1 which, in use, is arranged to be coupled to the domestic water supply system. The body of the faucet defines a generally cylindrical chamber 16 which communicates both with the inlet 1 and a spout 20 which defines an outlet duct. The spout 20 has an upstream portion defining an annular valve seat extending into the lower end of the chamber 16 and a downstream portion terminating in a discharge port 2.

A diaphragm 15 located in the chamber separates the chamber in a liquid-tight manner into upper and lower sections. The diaphragm 15 supports a valve 14 in the form of a plug and constrains it for movement within the chamber towards and away from the valve seat. The under side of the plug carries a projecting guide 14a which is arranged to engage the inner wall of the valve seat so as to guide the plug on to the valve seat. The guide 14a has a stepped or fluted profile so that as the valve is progressively opened, the flow rate through the valve will increase in a non-linear manner; very slowly at first and then progressively faster.

An upper chamber 4 located above the generally cylindrical chamber 16 is in communication with the inlet 1 via a channel 3. A valve member 8 in the channel 3 controls the flow of water through the channel 3. The upper chamber 4 is in communication with the cylindrical chamber 16 through openings in the roof of the chamber 16. Another channel 5 provides communication between the upper chamber 4 and the downstream portion of the spout 2. A valve member 9, located in the channel 5, opens and closes the flow to the channel. An adjustable restrictor assembly 6 in the channel 5 controls the rate of flow of liquid through the channel 5.

A lever 7 supported by a shaft is housed in the upper chamber 4. The shaft 17 projects through an opening in the roof of the upper chamber 4. An O-ring seal 11 between the shaft 17 and the roof not only provides a liquid-tight seal between the wall and the shaft 17, but also pivotally supports the shaft on the roof.

The two valve members 8 and 9 are each provided with a respective control rod 30,32. Each control rod 30,32 has a central portion of reduced cross-section. The ends of opposite arms of the control lever 7 are bifurcated and slidably engage the reduced cross-section portions of respective ones of the control rods. In this way there is a degree of lost motion in the coupling between the lever and the control rods of the two valve members.

Figure 2:
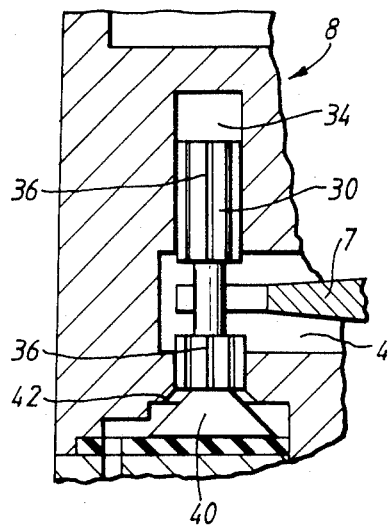
FIG. 2 is a scrap view to an enlarged scale of the inlet control valve of the faucet of FIG. 1.

The valve member 8 is shown in more detail in FIG. 2. As shown the control rod 30 is slidably housed in a bore 34 which traverses the upper chamber 4. The control rod 30 has a diameter just less than that of the bore 34 to allow the rod to slide easily along the bore 34 and also to provide a gap for the passage of water between the rod 30 and the inner wall of the bore 34.

The rod 30 is preferably provided with axially extending grooves 36 in its outer circumferential surface to permit a greater flow of water between the rod 30 and the bore 34.

The rod 30 at its lower end carries a frusto conical valve member 40 which is arranged to engage a frusto conical valve seat 42, when the rod is urged into the raised position by the arm 7 pivoting in a clockwise sense to engage the axial end face of the upper step in the control rod 30.

When the arm 7 is pivoted in an anti-clockwise sense (with the valve 40 closed) it will engage the axial end face of the lower step in the rod 30 and displace the rod 30 downwardly to open the valve 40.

Figure 3:
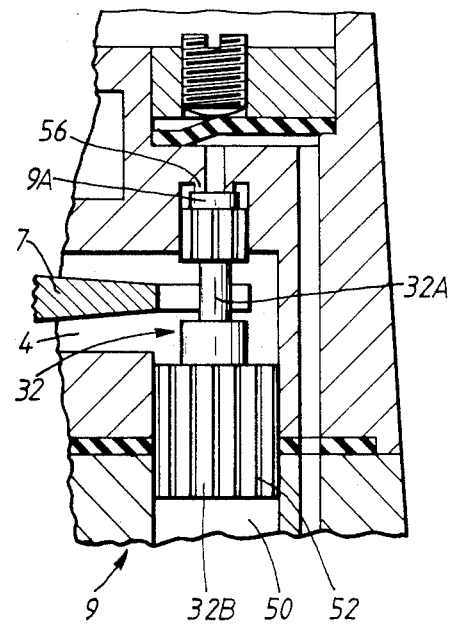
FIG. 3 is a scrap view to an enlarged scale of the outlet control valve of the faucet of FIG. 1.

The valve member 9 is shown in more detail in FIG. 3. The control rod 32 is housed in a bore 50 which also traverses the upper chamber 4. The rod 32 has an intermediate portion 32A of reduced cross-section and an end portion 32B of enlarged cross-section which enlarged end portion is housed in an enlarged part of the bore 50.

The diameter of the rod 32 where it lies within the bore is slightly smaller than bore 50 so as to allow the rod 32 to slide easily along the bore and to allow water to flow between the bore and the rod 32. Preferably the rod 32 is provided with grooves or slots to increase the rate of flow of water through the bore 50. The upper axial end of the rod 52 carries a rubber washer 9a of considerably lesser diameter than the bore but which can engage an annular valve seat 56 at the upper end of the bore to close off the flow of water through the bore 50. The arm of the lever 7 is arranged to control the upward and downward movement of the rod by engaging the axial and face of the upper and lower steps in the rod 32. Pivotal movement of the lever 7 in an anti-clockwise sense moves the rod 32 upwards to cause the washer 9a to engage the annular seat and so close the valve 9. Pivotal movement of the lever 7 in a clockwise sense moves the rod 32 downwards to open the valve 9.

The shaft 17 carries a lever 10 at its upper end. A pair of "ON" "OFF" push buttons 12 and 13 are located above the lever 10, one adjacent each of the two arms of the lever 10.

Each push button 12 and 13 is spring-loaded away from the lever 10 but has a respective actuating pin extending towards the lever, to engage and tilt the lever 10 upon depression of the corresponding button.

The restrictor assembly 6 is in the form of a flexible flap 26 urged by a grub screw 28 into the channel 5 to form a constriction. Adjustment of the grub screw 28 will increase or decrease the size of the constriction and so effect the flow through the channel 5 accordingly.

In operation with the faucet in the OFF condition, depression of the ON button will cause the water flow to increase progressively. Release of the ON button will prevent further increase in the water flow rate, and the water flow through the faucet will continue at a constant rate. Depression of the OFF button turns the faucet OFF, preventing water flow through the faucet. If the ON button is only partially depressed, a small flow is established which will automatically be shut off as soon as the ON button is released. When a flow through the faucet has been established and it is required to reduce this flow without turning the faucet OFF, a partial depression of the OFF button will achieve this. When the flow rate from the faucet has been reduced to the desired rate, releasing the OFF button will cause the flow to remain constant again.

In FIG. 1 the faucet is shown in the OFF condition. In this state the valve 8 is maintained open by the force of gravity. Instead the valve is biased into its open state by other means. A detent mechanism (not shown) is provided to hold the valve in its open state until forcibly returned to its closed state. Water pressure from the faucet inlet 1 communicates with the upper portion of the chamber 16 through the upper chamber 4, the channel 3 and the inlet valve 8. The outlet valve 9 in the passage 5 leading from the upper chamber 4 is maintained closed by the pressure of water in the upper chamber 4. Instead of or in addition to the water pressure the valve 9 is held closed by a spring (not shown) or by its buoyancy.

In this condition, both sides of the diaphragm 15 are subjected to the same pressure from the supply. However, as there is a greater surface area under pressure above the diaphragm than below it, there will be a greater force acting on the upper surface of the diaphragm and so the diaphragm will urge the plug 14 against its valve seat to block any flow of water from the lower section of the chamber 16 to the spout 2.

Depression of the ON button tilts the lever 7 and therefore the shaft 17 about its O-ring seal 11. This in turn displaces the lever 7 to open the valve 9 and to close the valve 8. The valve 8 is then maintained against its valve seat by water pressure from the inlet 1. A small volume of water now flows from the outlet valve 9, past the restrictor 6 into the faucet outlet 2 via channel 5. This reduces the pressure in the upper part of the chamber 16 and so the diaphragm 15 will slowly rise by an amount corresponding to the volume of water lost through outlet valve 9. The plug 14 is lifted by the water pressure and flow of water from inlet 1 via the lower section of the chamber 16 to outlet 2 can now take place. The longer that the ON button 13 is held depressed the greater will be the amount of water discharged through the valve and consequently the greater the flow through the faucet. The increase in flow rate through the faucet may be arrested at any point during the opening cycle by releasing the ON button. With the ON button released, water will flow through the faucet at the required constant rate until altered by depression of either the ON or OFF buttons.

With the faucet running at a constant rate, but not at maximum flow, an increase in the flow rate through the faucet is achieved by further depressing the ON button until the flow has increased to the desired rate. Once the desired rate has been achieved, the ON button is released and once more, water will flow through the faucet at a constant but now increased rate.

To reduce the rate of water flow without turning the faucet off altogether, the mechanism operates in the following manner: It should first be noted that the OFF button has two operating pressures. The first pressure is when the button is partially depressed and the second pressure is when the button is fully depressed. To reduce the faucet water flow without turning the faucet OFF, the OFF button is partially depressed to its first operating pressure. This opens the inlet valve 8 partially, while leaving the outlet valve 9 closed. In this condition, water flows into the chamber 16 above the diaphragm effecting a downward displacement of the plug 14. The water flow through the faucet is therefore reduced. As valve 8 is only partially opened, hydraulic pressure in the passage 3 will cause inlet valve 8 to be lifted against its seat as soon as the OFF button is released, thereby preventing any further closing of the faucet. The flow of water from the faucet will then remain constant until altered by a subsequent depression of either the ON or OFF button.

To stop all flow from the outlet 2, with the faucet running at a steady rate, the OFF button is depressed to its second pressure position. This tilts the lever 7 to open the inlet valve 8. The lost motion built into the outlet valve 9 between its operating shoulders allows the lever 7 to rise without displacing the outlet valve 9 and so the outlet valve 9 remains closed. With inlet valve 8 fully open, the chamber 4 and the upper section of chamber 16 will fill rapidly causing the faucet to close rapidly. The inlet valve is so profiled that the flow of water past it tends to hold it open. When the faucet is closed and no further flow passes the inlet valve, it will open under gravitational force. However, when the faucet is open and there is no flow past the inlet valve, the valve will close as will be explained hereinafter.

With the faucet closed, a very small flow may be established by partially depressing the ON button. This has the effect of opening the outlet valve 9 but the inlet valve 8 will remain fully open. With the inlet valve still open, the diaphragm holds the plug in its closed state, but with the outlet valve 9 open, a small flow is created through the restrictor 6 and the outlet channel 5 to the main faucet outlet 2. This gives a drip control facility to the faucet for the dispensing of small volumes of water. Releasing the ON button automatically closes the faucet in this instance, without the need for depressing the OFF button, because the inlet valve will return to its fully open position, while the outlet valve will close again.

The rate at which the faucet opens is governed by the rate at which water from the upper chamber flows through the restrictor 6. This is affected by the water supply pressure. To compensate for supply pressure variations, the flow through the restrictor 6 may be adjusted which, in turn, alters the rate at which the faucet opens.

An air pocket chamber (not shown) holding air is coupled to the passage 3. This damps any fluctuations in pressure in the inlet due to water hammer when the faucet closes rapidly.

With the faucet running at a steady rate, there will be a small drop in pressure across the valve seat tending to cause the diaphragm to descend. This produces a slight pressure drop in the upper section of the chamber 16, which in turn causes the inlet valve 8 to be held against its seat under the pressure from channel 3. In this way the diaphragm can hold the plug in its open position and so maintain a steady flow condition. However, as soon as the inlet valve 8 is opened, the diaphragm moves to urge the plug on to its seat.

The O-ring which provides the only seal between the ON OFF buttons and the lever 7 is not subjected to any frictional forces by turning or sliding but is distorted by the rocking action of the valve lever shaft 17. This feature allows for the use of a tight fitting O-ring, while still permitting the light operation of the push buttons.

In a modification, the two push buttons are replaced by a single rocker coupled to or replacing the lever 10.

While the faucet described is a purpose-made unit, it will be appreciated that it can be arranged as a sub-assembly without a main inlet, a main outlet and valve seat to be fitted in place of the upper part of a conventional faucet of the type which can be unscrewed from the lower part, which lower part consists of an inlet, outlet and valve seat.

It will be appreciated that the described faucet operates in a "fail-safe" manner. A leakage of water past the outlet valve 9 will be compensated for by water flowing through the open inlet valve 8, thus maintaining the pressure above the diaphragm to keep the faucet closed. Even a rupture of the diaphragm will not cause the faucet to open but would tend to keep it in the closed condition until the ruptured diaphragm is replaced.

The described mechanism of the faucet can be incorporated in fluidic circuits for controlling motors and in jacks in hydraulic circuits.

While the controlling mechanism for the faucet is described as being located in the faucet body, it can instead be situated remote from the faucet, to be housed in a separate control panel built into a sink unit, a bath or even into a wall to control a shower head, for example.

We claim:
1. A valve assembly comprising:
   a housing defining a chamber,
   a diaphragm located in the housing to divide the chamber into two separate sections,
   a common source of fluid,
   means defining a main flow path connected to one section,
   means defining a control flow path having an intermediate portion connected to the other section, both the main and control flow paths being arranged to be connected to the common source of fluid,
   a valve member supported by the diaphragm and movable in response to relative changes in pressure between the two sections to open and close the main flow path,
   an inlet and an outlet control valve mounted in the control flow path respectively upstream and downstream of the said portion of the flow control path, the two control valves being independently operable to change the pressure in said other section and thereby controlling the opening and closing of the main flow path by said valve member, the two control valves being both closed under any steady state flow condition in the main path, a lever arrangement, means pivotally supporting the lever arrangement on the housing, means coupling the lever arrangement both to the inlet control valve and the outlet control valve, means for controlling operation of the control valves for tilting of the lever arrangement in one sense opening the outlet valve and closing the inlet valve whereby to allow fluid to be expelled from the said other section of the chamber due to pressure from the fluid in the main flow path acting through the diaphragm, thereby to displace the valve into an open state, and tilting of the lever arrangement in the opposite sense, closing the outlet valve and opening the inlet valve, whereby to allow the pressure in the control path to act on the diaphragm to displace the valve member into its closed state, a spring biased ON button, means mounting the ON button on the housing for engagement with the lever arrangement, a spring biased OFF button, and means mounting the OFF button on the housing for engagement with the lever arrangement, the buttons respectively being for tilting said lever arrangement in said one sense and for tilting said lever arrangement in said opposite sense for rendering one of said buttons and one of said control valves inoperative by the lever arrangement while the other button and control valve is operative to engage said lever arrangement.

2. An assembly, according to claim 1, including means defining an outlet duct having an upstream end projecting into said one section of the chamber and defining a seat for the valve member, the duct, when the valve is seated thereon, acting to reduce the surface area of the diaphragm in said one section to which fluid pressure is applied and thereby enabling a net force to be exerted on the diaphragm, in a sense to hold the valve member in a closed state.

3. A valve assembly comprising:
(a) a housing having a chamber formed therein and defining an opening;
(b) a diaphragm disposed in said housing for dividing said chamber into a plurality of sections;
(c) a source of fluid;
(d) means defining a main flow path communicating with one of said sections for applying fluid pressure from said source of fluid to one side of said diaphragm;
(e) means defining a control flow path communicating with another of said sections for applying fluid pressure from said source of fluid to an opposite side of said diaphragm;
(f) a valve member disposed in said main flow path for controlling the flow of fluid within said main flow path, said valve member being connected to said diaphragm and movable by said diaphragm in response to the application of differential fluid pressure to said sides of said diaphragm;
(g) an inlet control valve disposed in said control flow path at the upstream end thereof;
(h) an outlet control valve disposed in said control flow path at the downstream end thereof;
(i) plural individually adjustable means for controlling the operation of said control valves, said control valves being independently operable to vary fluid pressure in said other section applied to said opposite side of said diaphragm for moving said valve member to control the flow of fluid within said main flow path, said control valves being closed during steady state flow of fluid within said main flow path;
(j) an O-ring received in said opening;
(k) lever means including a shaft sealing by engaging said O-ring to be pivotally supported thereby;
(l) valve control means coupling said lever means and said control valves for actuating said control valves in response to the pivotal movement of said lever means; and
(m) lever actuating means connected to said housing and responsive to said plural individually adjustable means for pivoting said lever means at times in one direction to open said outlet control valve and to render one of said adjustable means inoperative by direct engagement of said lever actuated means while closing said inlet control valve for the discharge of fluid from said other section of said chamber to reduce the fluid pressure applied to said opposite side of said diaphragm, said diaphragm being moved by the fluid pressure applied to said one side of said diaphragm to move said valve member for controlling the flow of fluid within said main flow path, said lever actuating means in response to said plural individually adjustable means at other times pivoting said lever means in an opposite direction to render the other one of said adjustable means inoperative by direct engagement of said lever actuating means while closing said outlet control valve and to open said inlet control valve for increasing the fluid pressure in said other section of said chamber applied to said opposite side of said diaphragm, said diaphragm being moved by the increase in fluid pressure applied to said opposite side of said diaphragm for moving said valve member to interrupt the flow of fluid within said main flow path.

4. A valve assembly according to claim 3 and further comprising:

outlet means disposed within said main flow path and projecting toward said one section of said chamber to form a valve seat for said valve member, said outlet means, when said valve member seats on said valve seat, reduces the surface area of said one side of said diaphragm to which fluid pressure in said one section is applied for maintaining the interruption of the flow of fluid into said outlet means via said valve seat.

5. A valve assembly according to claim 4 wherein said valve member is configured so that the flow rate of fluid within said main flow path increases in a non-linear manner as said valve member is moved away from said valve seat.

6. A valve assembly as claimed in claim 3 wherein said lever actuating means at still other times pivots said lever means to open simultaneouly said inlet control valve and said outlet control valve for the continuous flow of fluid through said control flow path.

7. A valve assembly according to claim 3 wherein said lever means includes a shaft for pivotal movement, and wherein said housing is formed with an opening in which said shaft is disposed, said valve assembly comprising an O-ring disposed in said opening through which said shaft passes, said O-ring supporting said shaft for pivotal movement and providing a seal between said shaft and said housing.

8. A valve assembly comprising:
   a housing defining a chamber,
   a diaphragm located in the housing to divide the chamber into two separate sections,
   a common source of fluid,
   means defining a main flow path connected to one section,
   means defining a control flow path having an intermediate portion connected to the other section, both the main and control flow paths being arranged to be connected to the common source of fluid,
   a valve member supported by the diaphragm and movable in response to relative changes in pressure between the two sections to open and close the main flow path,
   an inlet and an outlet control valve,
   means mounting said inlet and outlet control valves for limited independent movement of one another in the control flow path respectively upstream and downstream of the said portion of the flow control path, and
   means for operating the two control valves independently so that one control valve can be opened while the other control valve remains closed to change the pressure in said other section and thereby controlling the opening and closing of the main flow path by said valve member, the two control valves being both closed under any steady state flow condition in the main path, said control valve operating means including:
   a lever arrangement,
   means pivotally supporting the lever arrangement on the housing, and
   means coupling the lever arrangement both to the inlet control valve and outlet control valve, tilting of the lever arrangement in one sense opening the outlet valve and closing the inlet valve whereby to allow fluid to be expelled from the said other section of the chamber due to pressure from the fluid in the main flow path acting through the diaghragm, thereby to displace the valve into an open state, and tilting of the lever arrangement in the opposite sense, closing the outlet valve and opening the inlet valve, whereby to allow the pressure in the control path to act on the diaphragm to displace the valve member into its closed state.

9. An assembly, according to claim 8, wherein said means coupling the lever arrangement and the inlet and outlet valves provides a degree of lost motion, whereby to allow both inlet and outlet valves to be open simultaneously when the lever arrangement is tilted into a particular attitude, thereby to allow continuous flow of fluid through said control flow path.

10. An assembly, according to claim 8 wherein said plural individually adjustable means includes a spring biased ON button, and a spring biased OFF button, said assembly further comprising:
   means mounting the ON button on the housing for engagement with the lever arrangement, and
   means mounting the OFF button on the housing for engagement with the lever arrangement,
   the buttons respectively being arranged for tilting said lever arrangement in said one sense and for tilting said lever arrangement in said opposite sense.

11. An assembly, according to claim 8, including:
   a body housing the inlet and outlet control valves and the lever arrangement, the lever arrangement being supported by a shaft projecting from said body, and
   an O-ring seal providing a seal between the body and the shaft and providing pivotal support for said shaft, the axis of said O-ring seal and the axis of said shaft being coincident.

12. An assembly according to claim 8 including an adjustable flow restrictor for restricting the flow through the control path.

* * * * *